United States Patent
Sprinkle et al.

(10) Patent No.: US 6,851,495 B2
(45) Date of Patent: Feb. 8, 2005

(54) SPEED CONTROL FOR UTILITY VEHICLE OPERABLE FROM REARWARD-FACING SEAT

(75) Inventors: David Laverne Sprinkle, Warrenton, GA (US); John D. Sundberg, Martinez, GA (US)

(73) Assignee: Deere & Co., Moline, IL (US)

( * ) Notice: Subject to any disclaimer, the term of this patent is extended or adjusted under 35 U.S.C. 154(b) by 0 days.

(21) Appl. No.: 10/040,105

(22) Filed: Oct. 19, 2001

(65) Prior Publication Data

US 2003/0075378 A1 Apr. 24, 2003

(51) Int. Cl.$^7$ .............................................. B60K 17/28
(52) U.S. Cl. ...................... 180/53.2; 180/336; 180/338; 280/5.508
(58) Field of Search ........................... 280/5.502, 5.508, 280/5.51, 755; 180/53.2, 336, 338, 321, 323, 324, 330, 331

(56) References Cited

U.S. PATENT DOCUMENTS

| | | | |
|---|---|---|---|
| 4,091,889 A | * | 5/1978 | Brown et al. ................ 180/273 |
| 4,279,324 A | * | 7/1981 | Yotsumoto et al. .......... 180/336 |
| 4,282,711 A | | 8/1981 | Branstetter |
| 4,648,803 A | | 3/1987 | Stephenson et al. |
| 4,869,337 A | * | 9/1989 | Wagner ....................... 180/330 |
| 4,883,137 A | * | 11/1989 | Wanie et al. ............... 180/6.34 |
| 5,056,615 A | * | 10/1991 | Duthie et al. ................ 180/306 |
| 5,205,181 A | * | 4/1993 | Wright ....................... 74/480 R |
| 5,212,998 A | | 5/1993 | Testerman |
| 5,251,733 A | | 10/1993 | Falck et al. |
| 5,449,329 A | | 9/1995 | Brandon et al. |
| 5,456,333 A | * | 10/1995 | Brandt et al. ............... 180/336 |
| 5,509,496 A | * | 4/1996 | Erickson et al. ............ 180/307 |
| 5,678,469 A | * | 10/1997 | Lech ............................ 91/516 |
| 5,681,242 A | * | 10/1997 | Bates .......................... 477/180 |
| 6,002,976 A | | 12/1999 | Hollstein et al. |
| 6,022,292 A | | 2/2000 | Goodnight |
| 6,202,783 B1 | | 3/2001 | Taylor et al. |

* cited by examiner

*Primary Examiner*—Ruth Ilan
*Assistant Examiner*—Toan C To
(74) *Attorney, Agent, or Firm*—The Law Office of Randall T. Erickson, PC

(57) ABSTRACT

A speed control system for a utility vehicle, the vehicle having a forward-facing driving position and a rearward-facing seat, includes a creep control system for moving the utility vehicle, controlled from the rearward-facing seat. The vehicle includes a speed-controllable transmission operable to output power to drive a wheel. The vehicle includes a creep speed control actuator located adjacent to the rearward-facing seat and a creep speed control system operatively connected to the actuator and to the transmission. The system converts movement of the actuator to speed change of the transmission. The transmission can be a mechanically or electronically controlled hydrostatic transmission, or an electronically controlled reverser transmission.

21 Claims, 13 Drawing Sheets

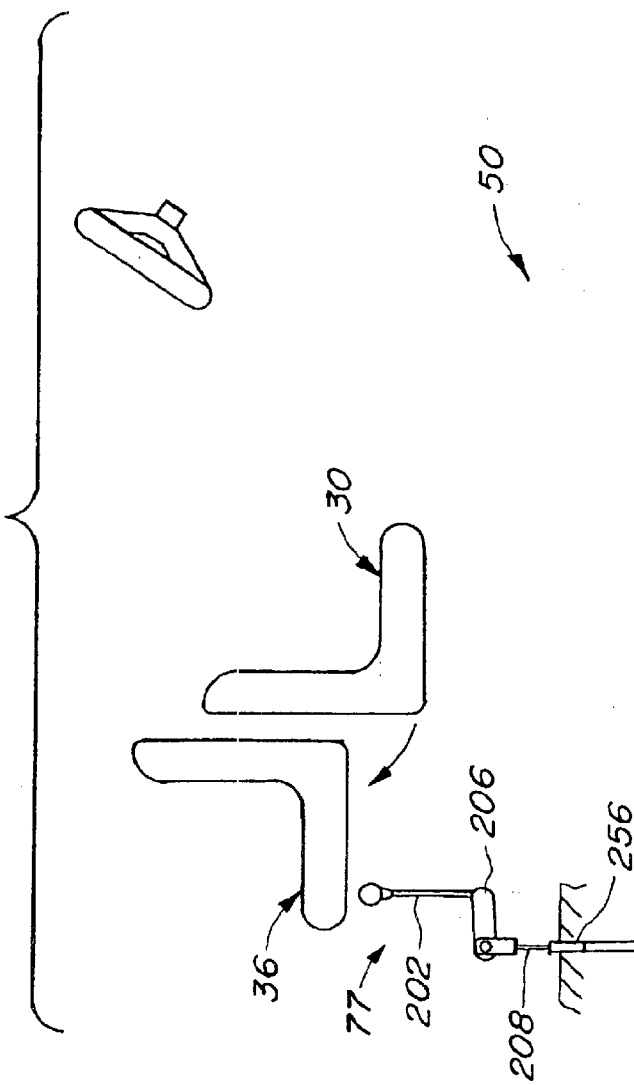
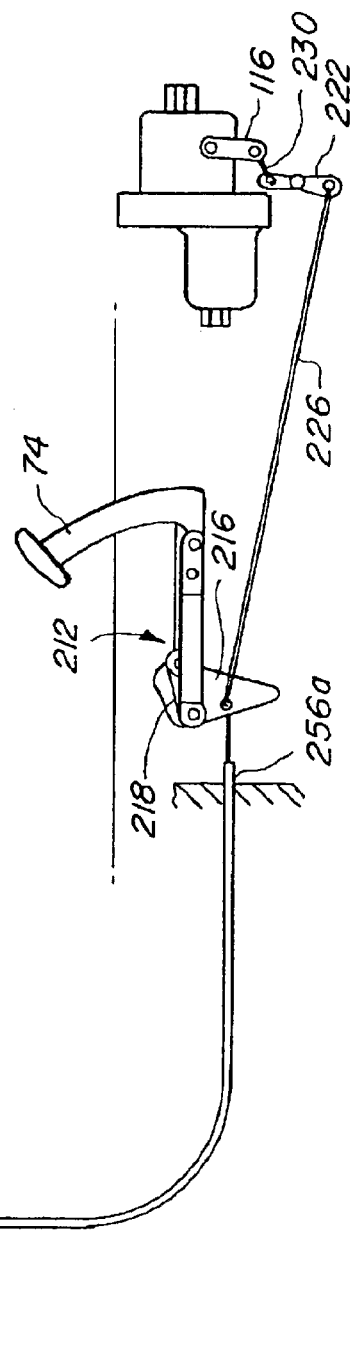
Fig. 6

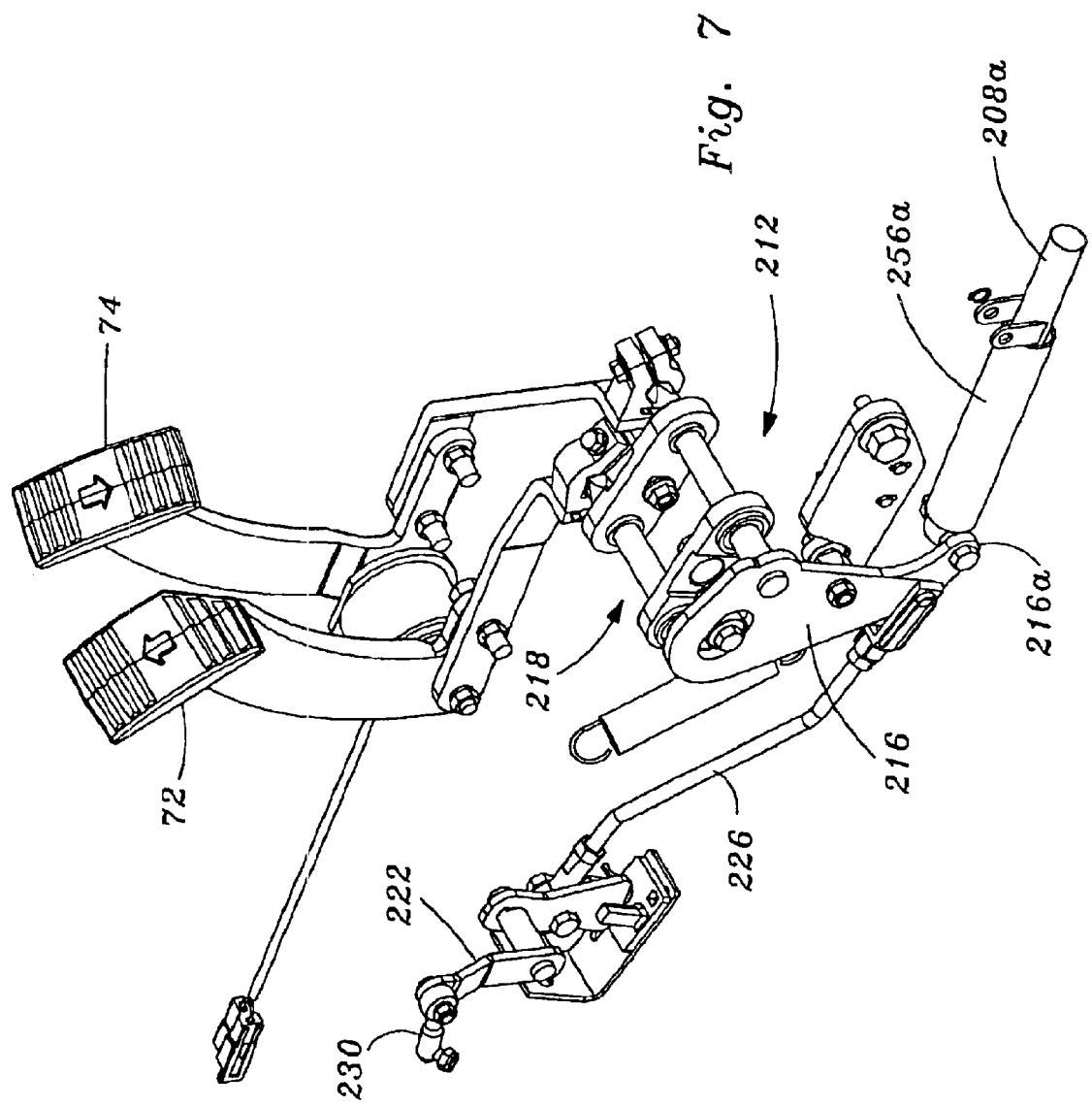

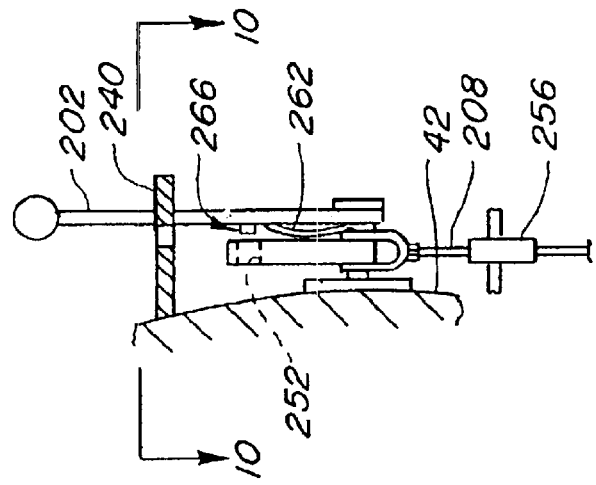
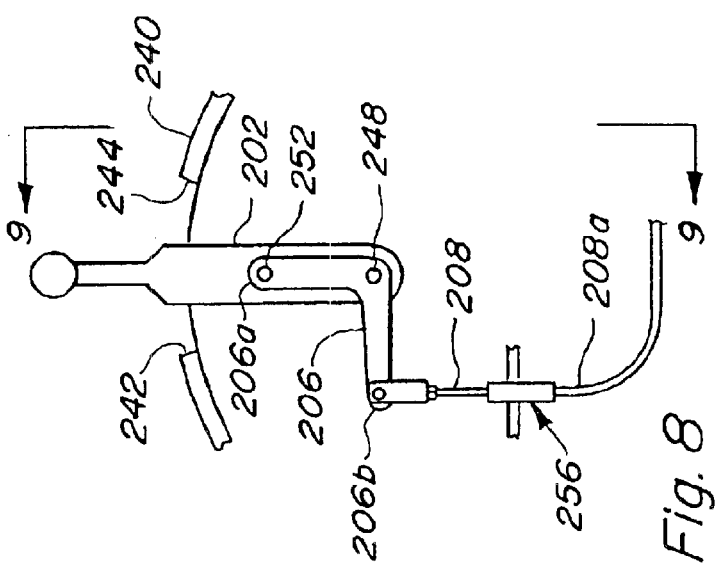
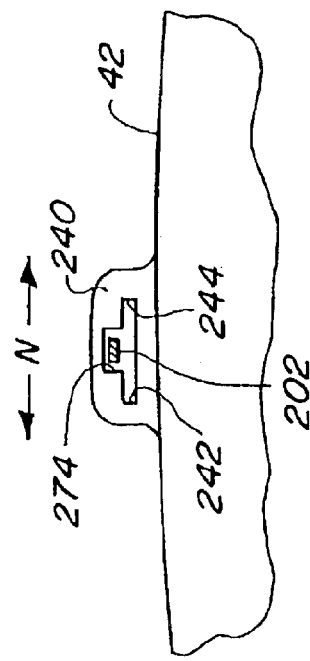

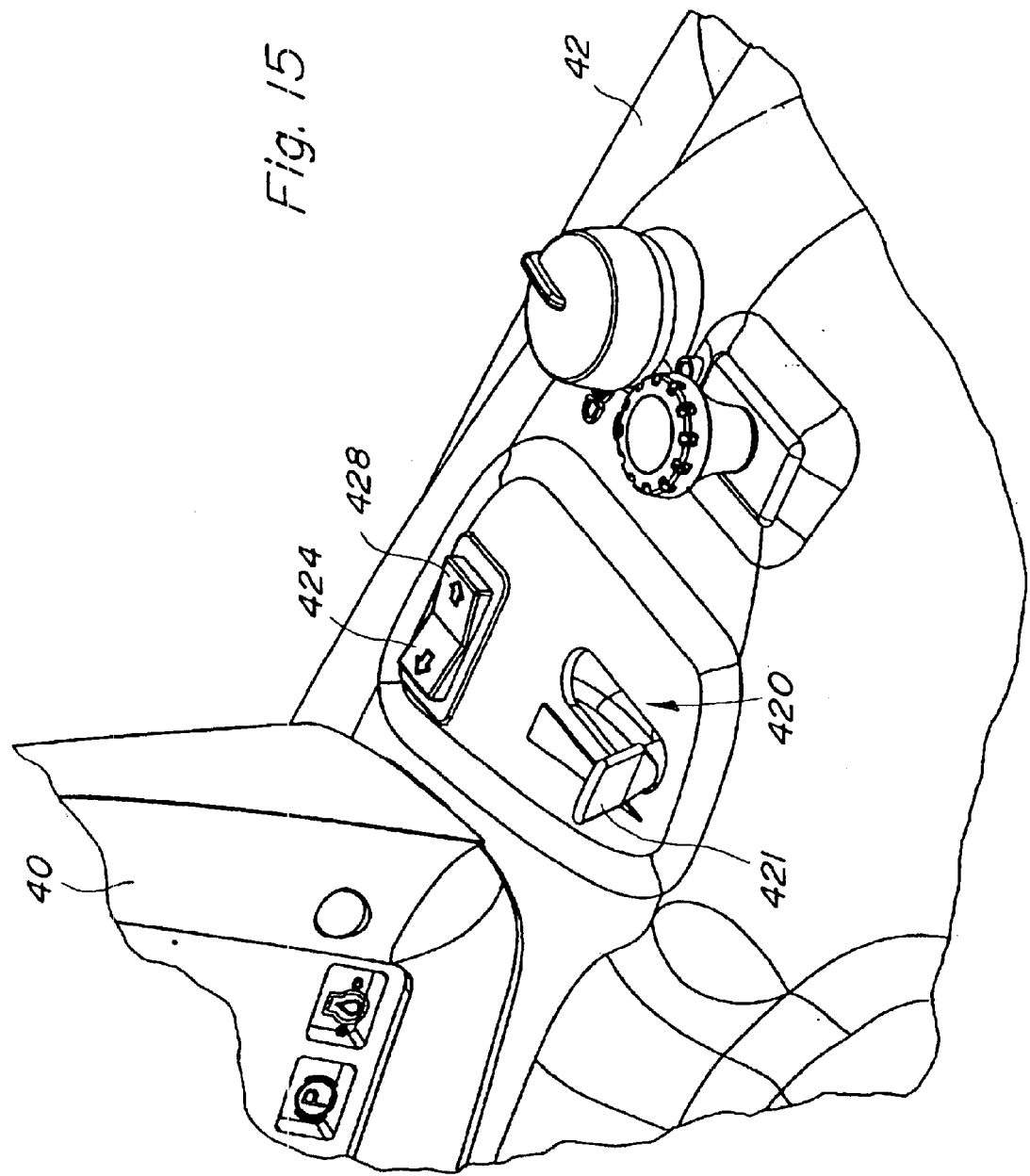

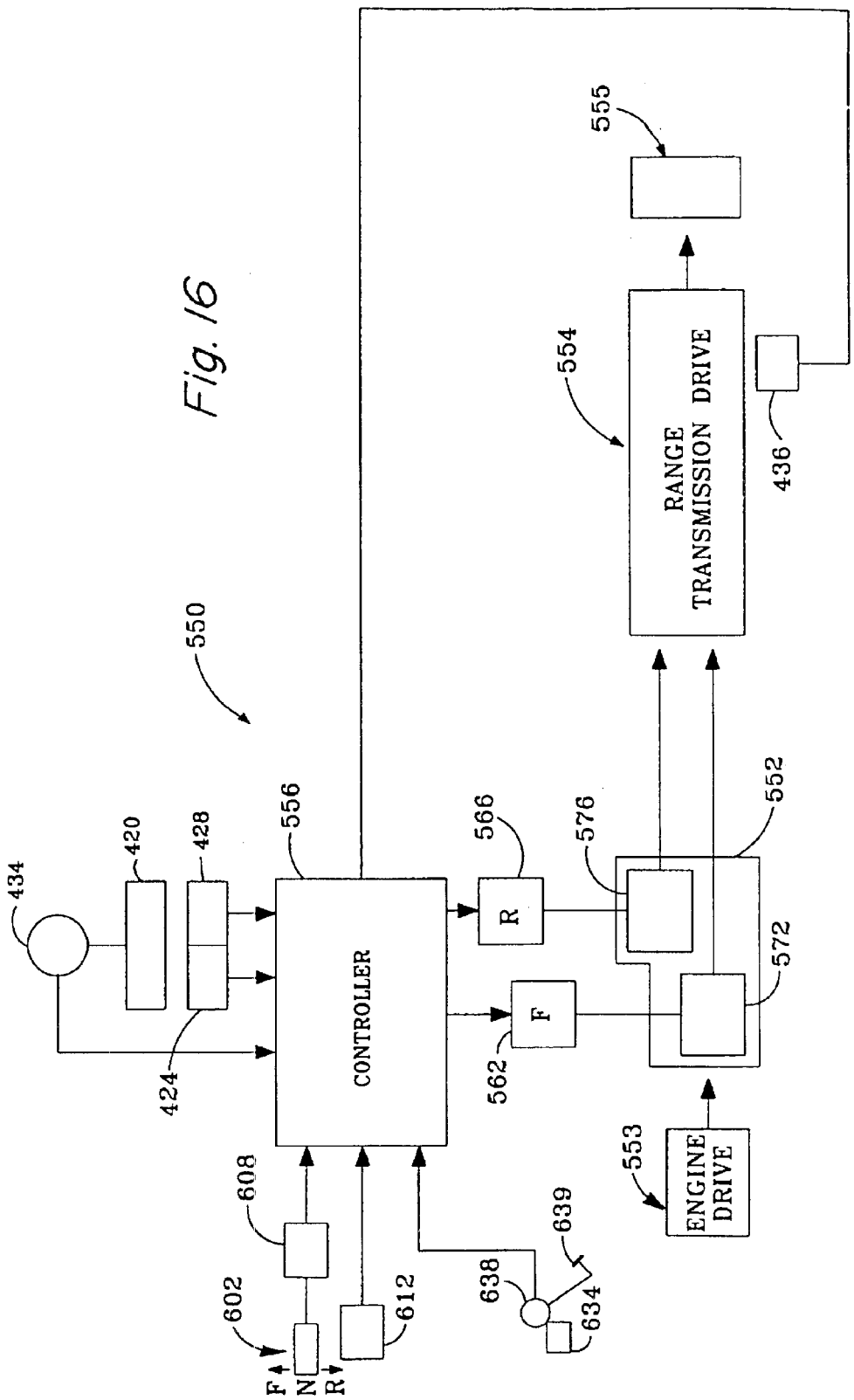

SPEED CONTROL FOR UTILITY VEHICLE OPERABLE FROM REARWARD-FACING SEAT

TECHNICAL FIELD OF THE INVENTION

The invention relates to utility vehicles for industrial and agricultural use, such as utility tractors. Particularly, the invention relates to transmission control systems for such vehicles.

BACKGROUND OF THE INVENTION

Typical utility vehicles, such as compact tractors, utilize an engine operating substantially at a pre-selected speed that drives a transmission system or drive train that delivers power to one or more driven wheels. The transmission system includes a speed controllable transmission component, a gear selection component, and a differential component. The speed controllable transmission component can be, for example, a hydrostatic transmission, or a transmission that uses electro-hydraulically controlled forward and reverse clutch packs to initially accelerate the vehicle and to change vehicle direction (hereinafter referred to as a "reverser transmission"), such as a POWRREVERSER™ transmission incorporated in JOHN DEERE Series 4000 tractors.

When using a backhoe attachment on a compact utility vehicle, it is sometimes necessary to move the utility vehicle forward or backward by small amounts and/or at slow speeds. For example, when excavating a trench, the backhoe must be moved rearward periodically as the trench progresses. For utility vehicles having a front facing seat for driving the vehicle and a rear facing seat for operating the backhoe, or a flip seat which is alternately the front facing and the rear facing seat, the forward and reverse controls are located proximate the front facing seat. It is not practical to move the tractor using the controls without the operator having to move from the rear seat to the front seat. Thus, the operator typically moves the vehicle by planting the backhoe bucket into the ground and hydraulically moving the backhoe, by extending or retracting the backhoe boom and/or rotating the backhoe bucket to trust the vehicle forward or backward using the reaction force from the backhoe. The resultant movement of the utility vehicle is "jerky" and uncomfortable to the operator. Also, moving the utility vehicle in this manner can damage the ground or turf depending on the circumstances.

For a utility vehicle having a hydrostatic transmission and operated by foot controls, it is not practical to reach the foot controls while seated facing rearward while operating the backhoe. In a compact tractor that utilizes a front seat for operating the hydrostatic transmission and a rear seat for operating the backhoe, it is not practical to rotate the seat from a rearward position facing the backhoe to a frontward driving position. There is not ample room in a compact vehicle to accomplish this task. It is also not considered to be a good practice for an operator to attempt to operate the hydrostatic transmission with the front foot controls while seated facing rearward.

The present inventors have recognized the desirability of providing a utility vehicle that can be effectively driven at a controlled speed by an operator seated at a back of the vehicle, facing rearward.

SUMMARY OF THE INVENTION

The present invention provides a creep speed control for operating a utility vehicle while seated in a rearward facing position and operating rear mounted implements, such as a backhoe attachment. The creep speed control includes a mechanical or electronic control arrangement that allows the operator to "creep" forward or rearward at a controlled speed while operating the rear mounted implement. The speed of the utility vehicle is limited by mechanical stops or electronic control to prevent unsafe speeds while the operator is facing rearward. Additionally, an operator presence switch prevents operation of the utility vehicle when the operator is not seated.

When the operator is seated in the rearward orientation, movement of the utility vehicle is predicated on two independent actions that are required to actuate the creep speed control, to prevent accidental motion. Movement of the utility vehicle is however unrestricted by the creep speed control while operating the vehicle in the normal, forward facing operator position.

For hydrostatic transmissions that are controlled mechanically, a hand operated linkage is provided that selectively moves a hydraulic servo system that moves the swashplate of the variable displacement pump within a limited angular range to cause either forward or reverse speed.

For hydrostatic transmissions that are controlled electronically, a speed/direction actuator, such as a fool pedal, with a position sensor, provides an analog signal to an electronic controller. This analog signal controls the transmission speed. Ground speed can be measured by a Hall effect sensor, which produces a frequency signal by counting gear teeth on a rotating gear in the transmission. Ground speed will be a variable from zero speed to a preset maximum creep speed. The maximum creep speed, and speeds less than the maximum creep speed, will thus be controlled independently of engine speed, or the range transmission gear selection.

The present invention maximizes operator convenience and ergonomics. The vehicle can be operated from the rearward-facing seat in a more controlled manner, obviating the practice of positioning of the tractor using the reaction force from the backhoe. During tractor positioning, the operator may remain in the best location for operating rear-mounted implements, such as a backhoe. The operator will not be tempted to straddle the seat to engage front operated speed controls. Vehicle productivity will be increased because positioning of the vehicle will be more effectively accomplished, without interrupting operation of the rear-mounted implement.

Numerous other advantages and features of the present invention will become readily apparent from the following detailed description of the invention and the embodiments thereof, from the claims and from the accompanying drawings.

BRIEF DESCRIPTION OF THE DRAWINGS

FIG. 6 is a schematic elevational view of a first embodiment speed control system using a mechanical linkage for implementing speed control;

FIG. 7 is a fragmentary perspective view of a portion of the system of FIG. 6;

FIG. 8 is a fragmentary, enlarged sectional view of a portion of the system of FIG. 6;

FIG. 9 is a sectional view taken generally along line 9—9 of FIG. 8;

FIG. 10 is a sectional view taken generally along line 10—10 of FIG. 9;

FIG. 15 is a fragmentary perspective view of a speed actuator and direction switches of the invention; and FIG. 16 is a block diagram of an alternate speed control system of the invention has applied to a reverser transmission.

DETAILED DESCRIPTION OF THE PREFERRED EMBODIMENTS

Figure 1:
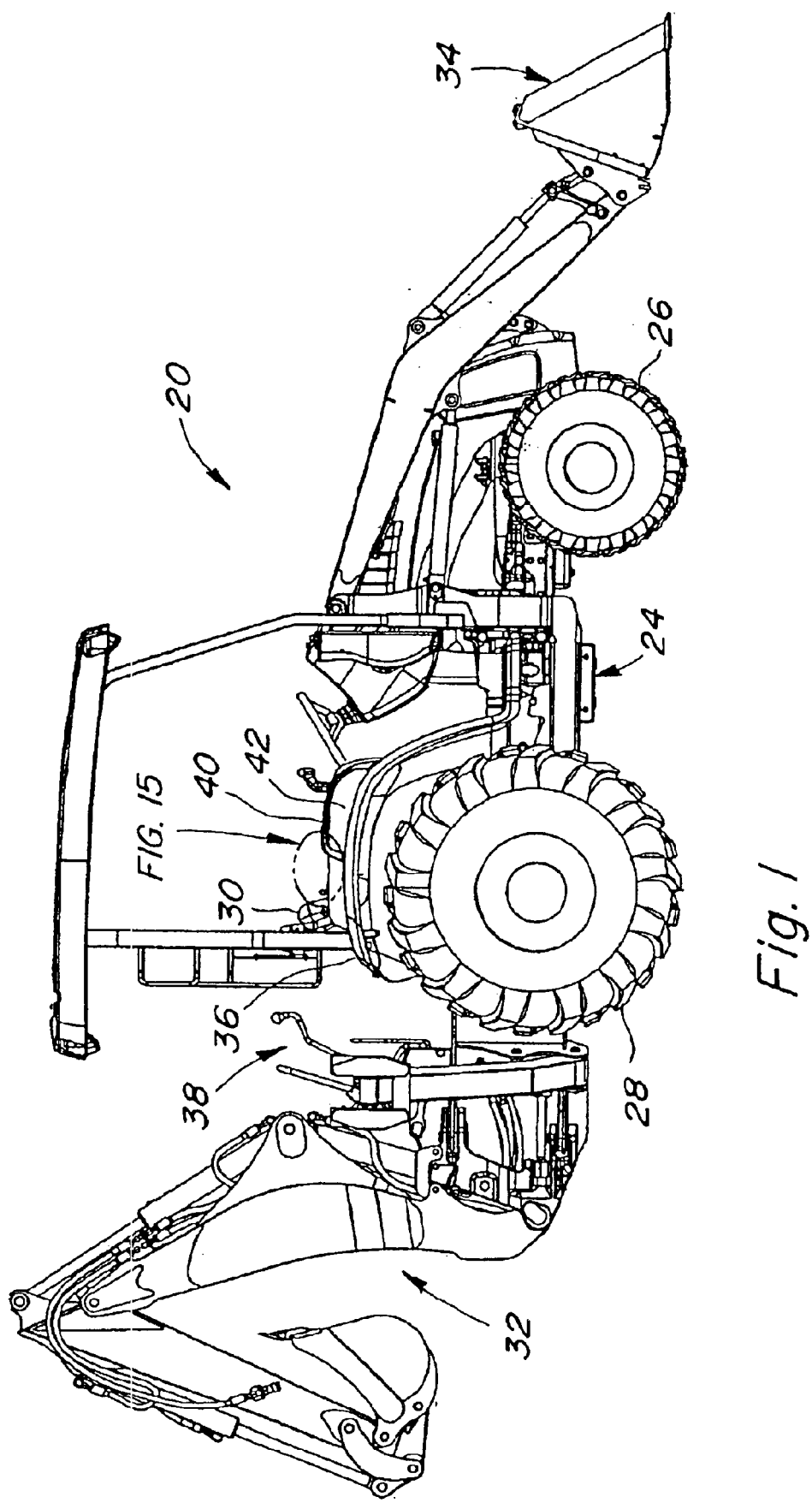
FIG. 1 is an elevational view of a utility vehicle incorporating the speed control system of the present invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIG. 1 illustrates a utility vehicle 20, such as a compact tractor-loader-backhoe, which incorporates a creep speed control system of the present invention. The utility vehicle includes a chassis 24 supported on a pair of front wheels 26 and larger rear wheels 28. The chassis supports a forward-facing driver's seat 30. The tractor shown in FIG. 1 is outfitted with a rear-mounted implement, such as a backhoe attachment 32, and a front mounted implement, such as a loader 34. Direction and speed drive controls for normal, forward-facing, operation are arranged, either as foot pedals or as a control lever or actuator, operable from the driver's seat 30.

The backhoe attachment 32 includes a rearward-facing operator seat 36 and backhoe controls 38. The rearward-facing seat 36 can be a flip seat from the frontfacing seat 30. An operator console 40 is arranged on an adjacent fender 42. According to the invention described herein, a creep speed control system 50 is arranged to be actuated by an operator sitting in the operator seat 36 (shown in FIG. 15). The creep speed control system 50 allows the operator to move the utility vehicle at a controlled speed, forward or reverse, while operating the rear mounted implement.

Creep Speed Control for a Utility Vehicle Driven by a Hydrostatic Transmission

Figure 2:
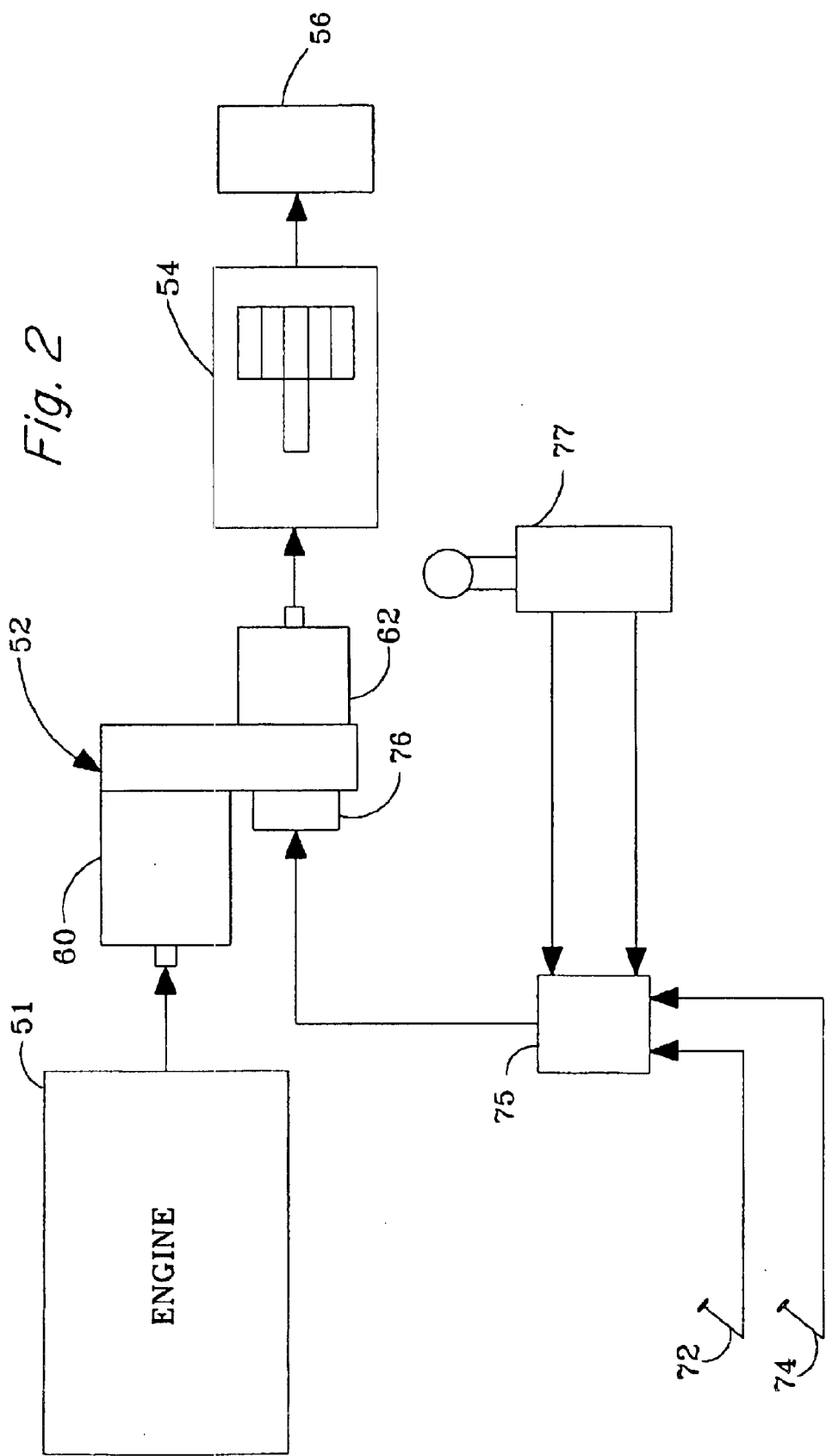
FIG. 2 is a block diagram of the speed control system of the present invention applied to a hydrostatic transmission system.

FIG. 2 illustrates, in block diagram form, the vehicle 20 incorporating the speed control system 50 of the present invention. The vehicle includes an engine 51 that drives a hydrostatic transmission 52. The hydrostatic transmission 52 drives a range gear drive, such as a multi-speed gear transmission 54, for transmitting power through a differential (not shown) to one or more driven wheels 56. The tractor speed is controlled by adjustment of the speed output of the hydrostatic transmission 52.

The hydrostatic transmission 52 includes a variable displacement pump 60, and a hydraulic motor 62. The engine 51 rotationally drives the variable displacement pump 60. The pump 60 drives the motor 62. The hydraulic motor drives the multi-gear transmission drive 54 interposed between the hydraulic motor 62 and the driven wheel 56.

Forward and reverse pedals 72, 74 are mechanically connected via a linkage system 75 to a servo system 76 of the transmission 52. A forward and reverse rear control 77 is also mechanically connected to the linkage system 75. The pedals 72, 74 and the rear control 77 can be alternately operated to control transmission speed via the linkage system 75 and the servo system 76.

Figure 3:
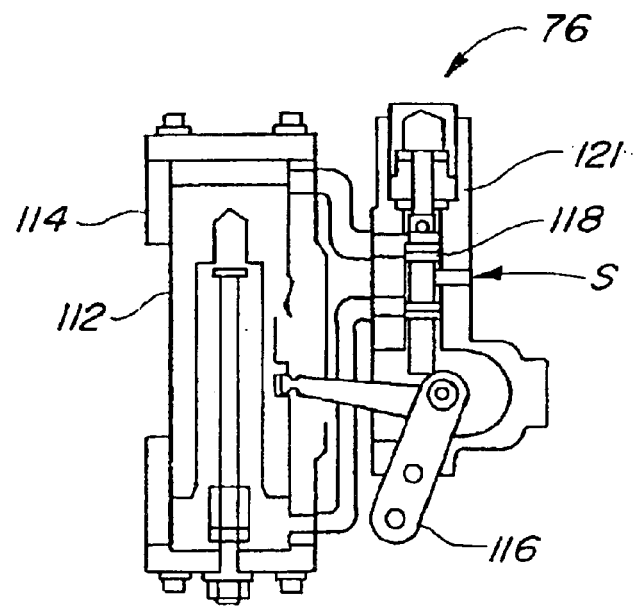
FIG. 3 is a schematic sectional view of a mechanically controlled servo control system used in a hydrostatic transmission of FIG. 2.
Figure 4:
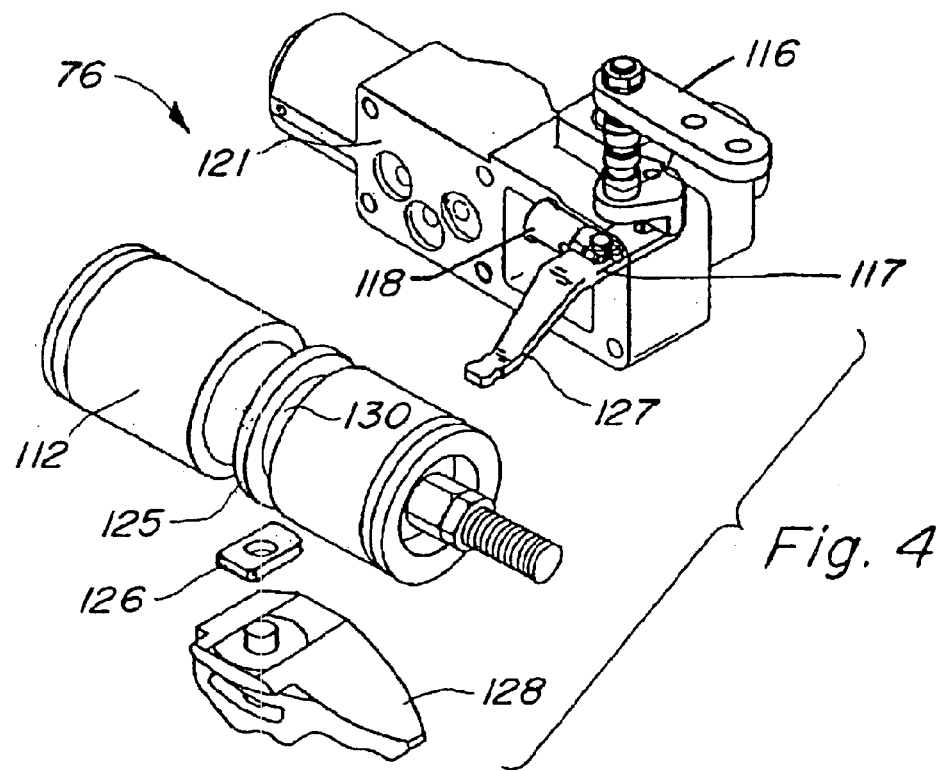
FIG. 4 is an exploded, fragmentary perspective view of the servo control system of FIG. 2.

FIGS. 3 and 4 illustrate a servo system 76 that controls speed of the transmission 52. The system 76 includes a piston 112 slidable within a cylinder 114. A servo control lever 116 moves a spool lever 117 that forcibly slides a valve spool 118 within a spool housing 121. The relative positioning of the spool 118 within the housing 121 directs pressurized hydraulic fluid to a select side of the piston 112 within the cylinder 114 to move the servo piston 112 in a select direction.

The piston 112 has a notch 125 that holds a piston follower 126 (FIG. 4). The piston follower 126 controls movement of a variable displacement pump cam plate or swashplate 128. Movement of the piston 112 causes the swashplate 128 in the hydraulic pump to rotate out of the neutral position.

Maximum displacement of the pump 60, for forward direction, is attained when the servo piston 112 is moved to its extreme position, upward in FIG. 4. Maximum displacement of the pump 60, for reverse direction, is attained when the servo piston 112 is moved to its extreme position, downward in FIG. 4. The swashplate 128 is adjustable over a range of forward and reverse positions selected by the foot pedals 72, 74.

Figure 5:
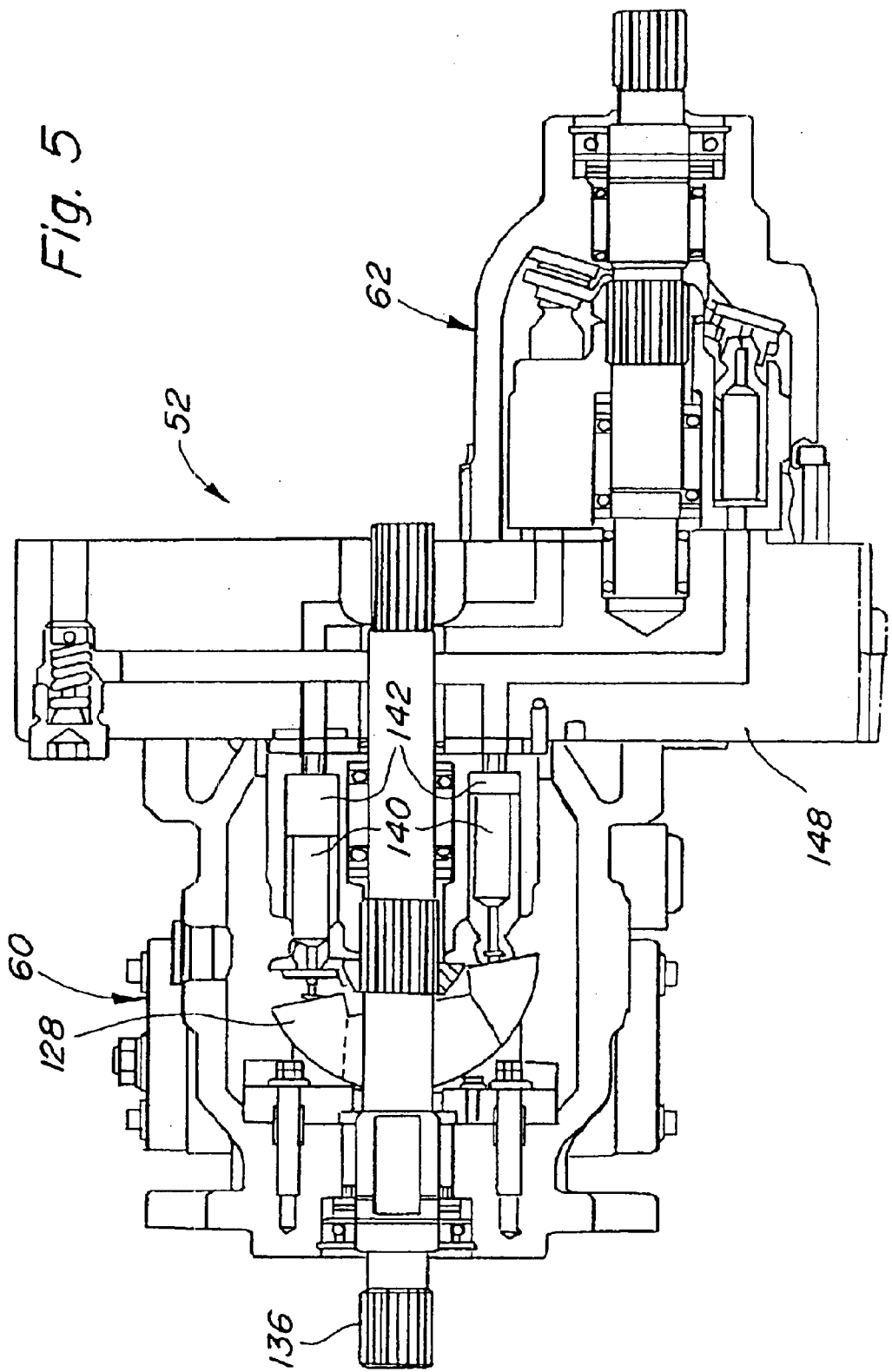
FIG. 5 is a schematic sectional view of a hydrostatic transmission.

FIG. 5 illustrates the hydrostatic transmission 52 in more detail. The hydrostatic pump 60 illustrated is an axial piston, servo controlled, variable displacement piston pump. Input shaft spines 136 are driven via a flex plate (not shown) bolted onto the engine flywheel (not shown).

Changing the angle of the swashplate 128 controls fluid flow through the pump 60, and thus controls transmission speed. The servo piston 112 controls this angle.

The tilting, off centerline, of the swashplate controls the distance the pistons 140 travel inside the piston bores 142 of the rotating assembly. The direction that the swashplate is rotated from center determines the direction of fluid flow (forward or reverse). The number of degrees the cam plate is deflected determines how much fluid will be displaced, i.e., the amount of deflection determines the transmission speed.

The hydrostatic pump 60 provides hydraulic fluid to the hydrostatic motor 60 to through the back plate 148, to drive the hydrostatic motor. Hydraulic fluid in the power train circulates in a closed loop. Fluid leaves the hydrostatic pump 60, flows through the hydrostatic motor 60 to, and is returned to the hydrostatic pump.

The hydrostatic motor 62 is a high torque axial piston motor. The motor is located on the rear of the back plate. The hydrostatic motor drives an output shaft coupled to the range transmission 54 that transfers power to the wheels. The range transmission 54 can be a multi-speed range gear transmission, such as a three-speed or four-speed gearbox.

FIG. 6 illustrates mechanically operated creep speed control system 50 of the present invention. The rear creep speed control 77 is activated by a creep lever 202 positioned adjacent to the operator seat 36. The creep lever 202 is operatively connected to a linkage element, such as a bell crank 206. The bell crank 206 is connected to a push pull cable 208 that extends through or under the vehicle body to be connected to the foot control linkage 212 as shown in FIG. 7. The cable 208 is surrounded by a sleeve 208a that is fixed to the chassis or utility vehicle body at anchors 256, 256a. FIGS. 8–10 describe the arrangement of the rear speed control 77 in more detail.

FIGS. 6 and 7 describe the arrangement of the front pedal controls. In normal operation from the driver's seat, the foot pedals 72, 74 drive a primary bell crank 216 into rotation through a forward/reverse link 218. The primary bell crank 216 is connected to a control lever 222 via a primary push-pull rod 226. The lever 222 is connected by a further link 230 to the servo lever 116 that, by rotation, changes in the annular position of the swashplate to drive the hydrostatic transmission at a selected speed, as illustrated in FIGS. 3 and 4, in either forward or reverse direction. The push pull cable 208 from the creep speed control 77 is connected to the bell crank 216 at the connection 216a. Selective pushing or pulling of the cable 208 by the system 77 causes controlled forward or reverse speed of the utility vehicle.

FIG. 8 illustrates the creep lever 202 connected to the creep bell crank 206 and protruding from a console 240 mounted to the fender 42. The console includes forward and reverse end stops 242, 244 that limit the speed of the vehicle by limiting the movement range of the creep controlled lever. The lever 202 is pinned, with the crank 206, at a point 248 to the fender 42. The crank 206 includes a hole 252 at a top thereof. The push pull rod 208 is connected to a bottom end 206b of the crank 206. The anchor 256 fixes the outer sleeve 208a of the push pull rod 208 with respect to the tractor body or chassis.

FIG. 9 illustrates the creep lever console 240 and creep lever 202, in rear view, mounted on the vehicle fender 42. A leaf spring 262 holds the creep lever 202 in a direction away from the fender 42. In order for the creep lever 202 to turn the bell crank 206, it must be pushed toward the fender 42 for a peg 266 on the lever to engage the hole 252 in the bell crank 206. Once the peg 266 and the hole 252 are engaged, the lever 202 and the bell crank 206 pivot together.

FIG. 10 additionally shows the console 240 includes a neutral position notch 274. The leaf spring holds the creep lever 202 in the neutral position notch 274 when the lever reaches the neutral position and outward hand force (toward the fender 42) on the lever 202 is removed. An outward hand force on the lever 202 toward the fender 42 frees the lever from the notch 274.

Figure 8A:
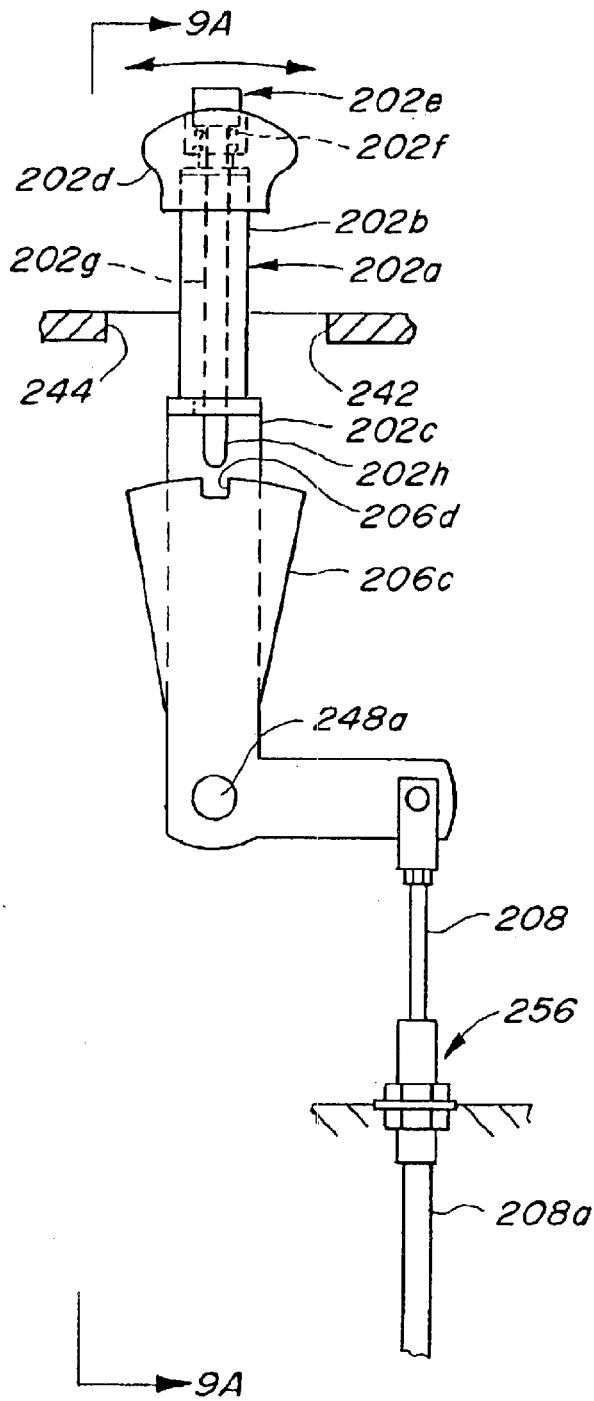
FIG. 8A is a fragmentary sectional view of an alternate embodiment creep lever.
Figure 9A:
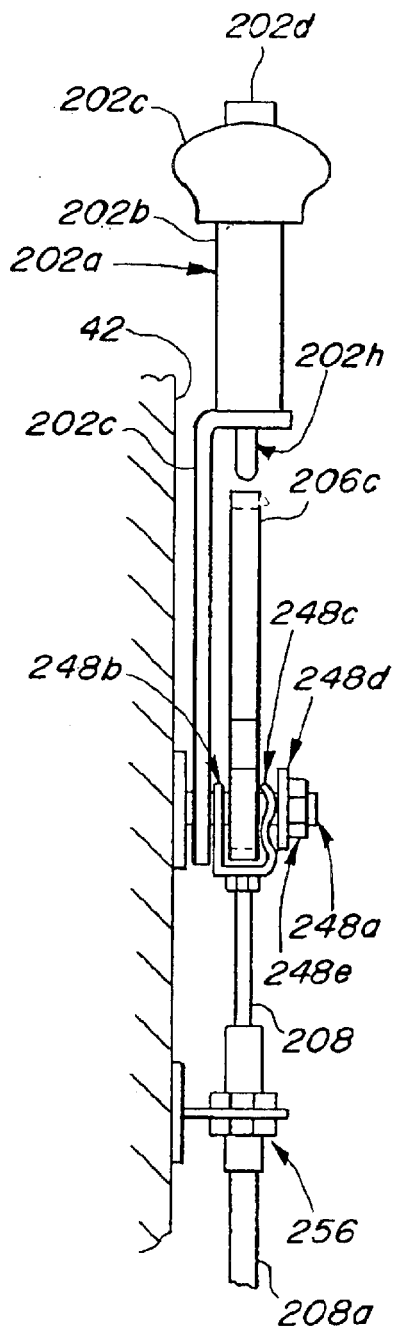
FIG. 9A is a sectional view taken generally along line 9A—9A of FIG. 8A.

FIGS. 8A and 9A illustrate an alternate embodiment mechanical arrangement to that shown in FIGS. 8 and 9. A creep lever 202a includes an upper lever portion 202b fixed to a lower L-shaped lever portion 202c. The lever 202a is pivotable on a stud 248a that carries a low friction Teflon washer 248b, a bell crank 206c, a wave spring 248c, a flat washer 248d, and a jam nut 248e.

A hand knob 202d on a top of the upper lever portion 202b includes an activation button 202e supported on an internal coil spring 202f. The button is connected to a rod 202g which extends below of the upper lever portion 202b, forming a peg 202h.

The bell crank 206c includes a notch 206d which must be engaged by the peg 202h in order for the lever 202a and the bell crank 206c to be pivoted together in forward or reverse direction from the neutral (zero speed) position shown in FIG. 8A.

The push pull rod 208 moves the primary bell crank 216 as illustrated in FIGS. 6 and 7, to move the servo lever 116. Thus, movement of the push pull rod 208 by the lever 202 causes angular movement of the swashplate 128.

While operating the creep speed control, a "backup alarm" can be provided to sound while the creep system is in use, either in forward or reverse direction, as a warning of vehicle movement.

Figure 11:
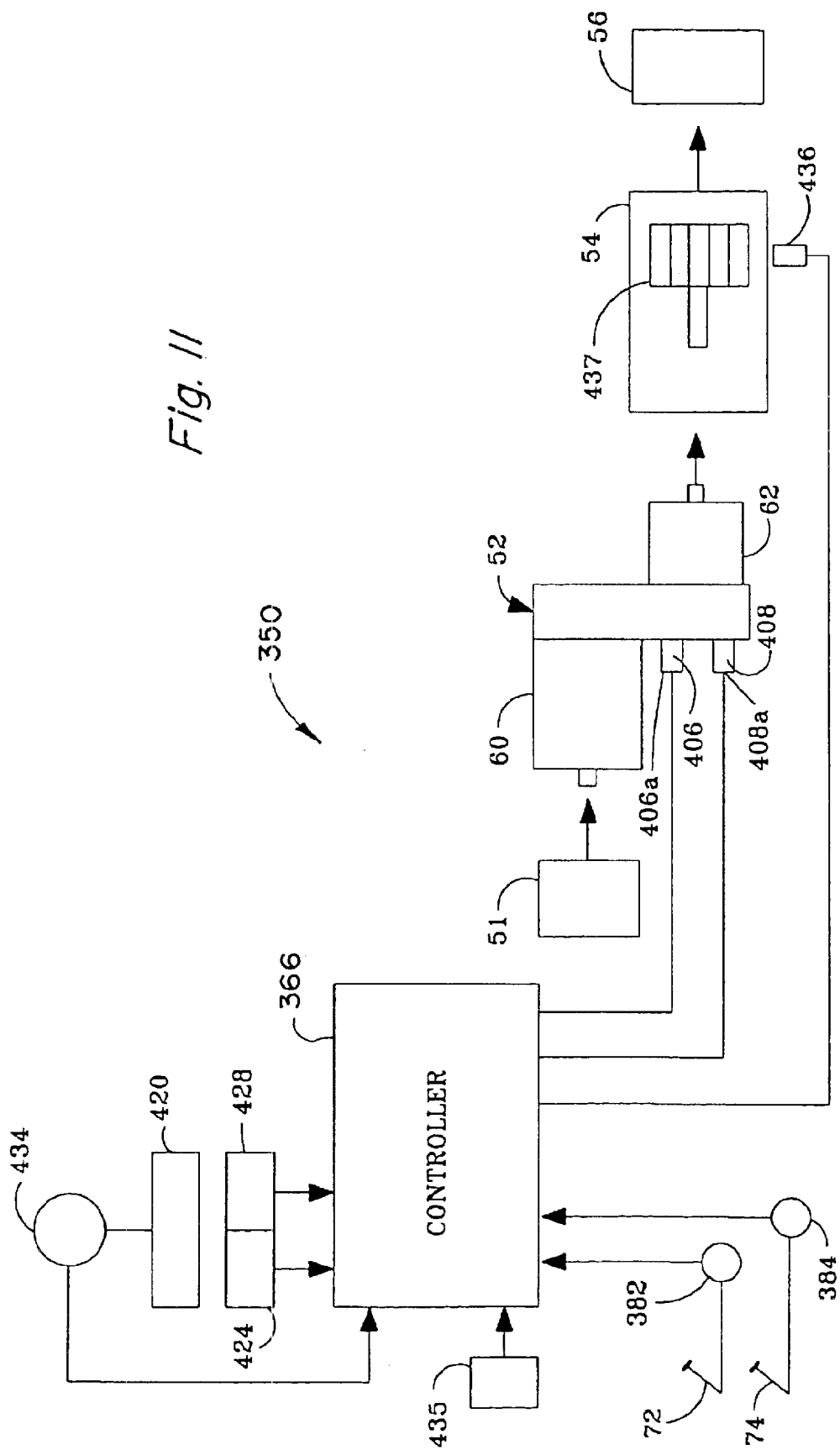
FIG. 11 is a block diagram of a second embodiment speed control system using an electronic control system for implementing speed control.

FIG. 11 illustrates a second embodiment wherein a speed control system 350 of the invention is accomplished using electronic control. The control system 350 includes a controller 366, such as a microprocessor-based microcontroller. For normal, forward-facing operation, the control system 350 includes the forward pedal 72 and the reverse pedal 74. The forward pedal 72 is operatively engaged with a potentiometer 382 to produce a forward pedal position signal, and the reverse pedal 74 is operatively engaged with a potentiometer 384 to produce a reverse pedal position signal. The potentiometers 382, 384 are signal-connected to the controller 366.

The controller 366 is signal-connected, through appropriate signal conditioning or amplifying circuitry (not shown), to a solenoid 406a of a forward drive proportional pressure control valve 406 and to a solenoid 408a of a reverse drive proportional pressure control valve 408. The output current to energize the forward or reverse pressure control valves 406, 408 is substantially proportional to the corresponding pedal position signal.

For creep speed control from a rear of the vehicle, the system 350 includes a creep speed control actuator 420 and direction switches 424, 428. The direction switches 424, 428 are preferably momentary switches that must be continuously pressed to remain activated. Only one of the switches 424, 428 can be activated at a given time. In this regard, the switches 424, 428 can be formed by a toggle switch, pivoted to either engage switch 424 or switch 428 and which spring returns to a neutral position, neither switch activated, when neither switch is pressed.

The actuator 420 includes a slide lever 421 operatively associated with a lever position sensor, such as a potentiometer 434. The potentiometer 434 is signal-connected to the controller 366. The controller 366 is pre-programmed to send a proportional speed signal, in response to, and proportional to, a signal from the potentiometer 434, to the respective solenoid 406a, 408a, depending on which switch 424, 428 is activated. The proportional speed signal ranges from a zero speed signal up to a pre-programmed maximum speed signal corresponding to the maximum travel or position of the actuator 420.

To enable the creep control system 350, particularly the actuator 420 and switches 424, 428, a seat switch 435 must first detect the presence of an operator sitting in the rear seat 36.

A rotation speed sensor 436, such as a Hall effect sensor, is arranged adjacent to a rotating part of the range transmission, such as a gear 437 that rotates in direct proportion to the vehicle ground speed. The controller 366 receives a frequency signal from the sensor 436 and adjusts the output speed signal to the proportional pressure reducing valve solenoids 406a, 408a to maintain the preprogrammed speed selected by the pedals 72, 74 or by the actuator 420.

Ground speed will be variable from zero speed to a preset maximum safe speed for creep operation, given that the vehicle is being operated slowly, temporarily from the rear.

This maximum allowable speed will be independent of engine speed, or of range transmission gear selection. The ground speed sensed by the Hall effect sensor is used as a feedback signal to the controller so that the selected speed is maintaining regardless of the range transmission gear selection or engine speed.

Figure 12:
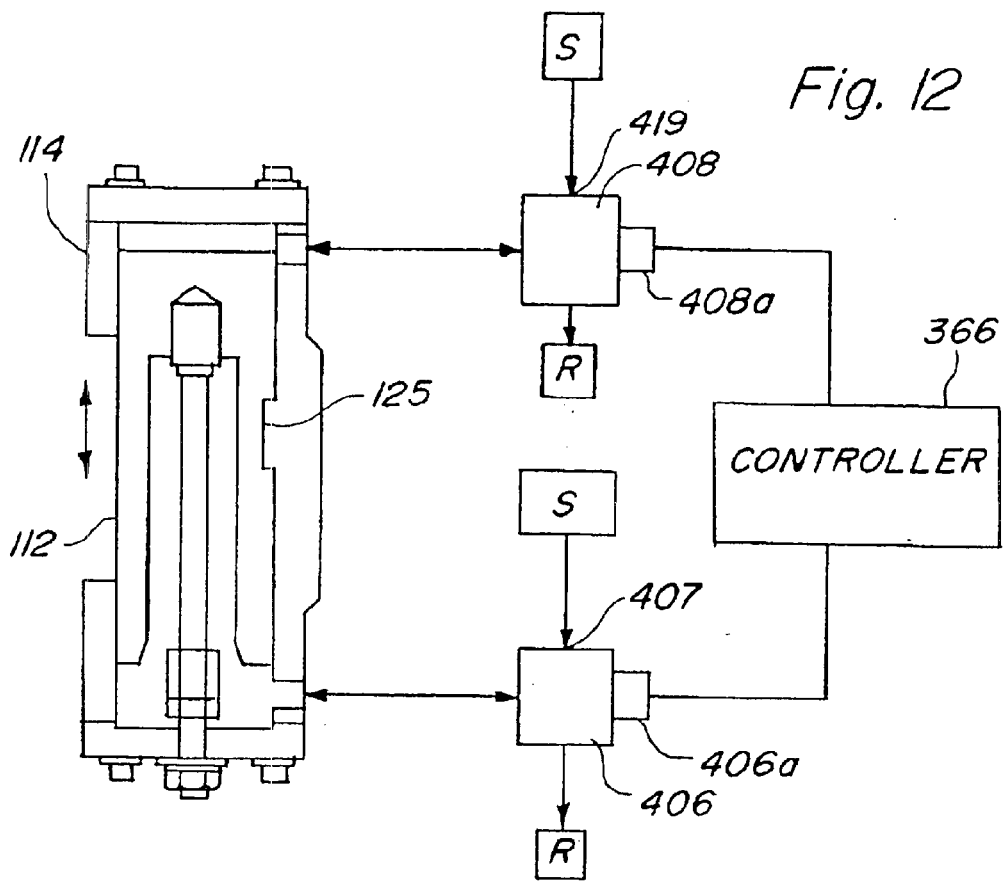
FIG. 12 is a schematic sectional view of the servo control system used in the control system of FIG. 11.
Figure 13:
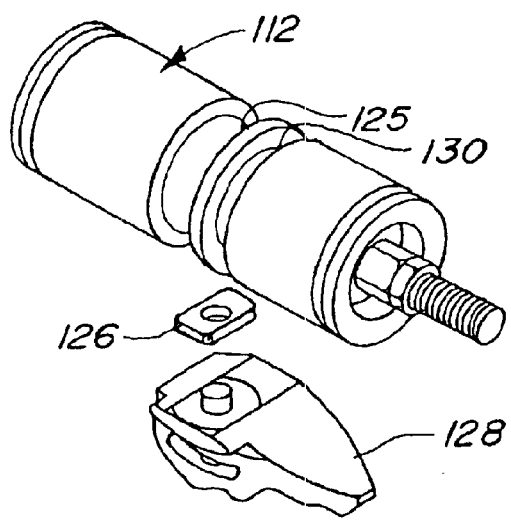
FIG. 13 is an exploded, fragmentary perspective view of the servo control system of FIG. 12.

FIGS. 12 and 13 illustrate the hydrostatic transmission servo control in more detail. Given an engine drive speed and a range transmission gear selection, the hydrostatic transmission provides variable speed control, forward and reverse, by operation of the foot pedals 72, 74 during normal operation, and by the actuator 420 during creep operation. Each valve 406, 408 is connected to a source of pressurized hydraulic fluid S and a return channel R at a reduced pressure. Preferably, the return channel R re-circulates hydraulic fluid back to the vehicle's hydraulic system reservoir.

Depressing the forward foot pedal 72 during normal operation, or pushing the actuator 420 and the forward switches 424 during creep operation, causes an electrical output signal or voltage of the potentiometer 382 to be transmitted to the controller 366. The controller 366, through software, sends an electrical signal to energize the solenoid 406a of the forward drive proportional valve 406. The proportional valve 406 is opened according to the electrical signal, allowing pressurized hydraulic fluid, fed from the source S into the inlet 407 of the valve 406, to flow through the valve 406 to pressurize a servo cylinder 114 on one side of a servo piston 112 that is slidably housed in the cylinder 114. The other valve 408 allows fluid to flow from within the cylinder 114, from an opposite side of the servo piston 112, to the return channel R.

When the reverse pedal 74 is pressed during normal operation, or the actuator 420 is pushed and the reverse switch 428 is activated during creep operation, the potentiometer 384 sends an electrical output signal or voltage to the controller 366. The controller 366, through software, sends an electrical signal to energize the solenoid 408a of the reverse drive proportional valve 408. The reverse drive proportional valve 408 is opened, according to the electrical signal, to allow pressurized hydraulic fluid, fed into an inlet 419 of the valve 408 from the source S, to flow through the valve 408 to pressurize the servo cylinder 114 on an opposite side of the servo piston 112 within the cylinder 114. The other valve 406 allows fluid to flow from within the cylinder 114, from the one side of the servo piston 112, to the return channel R.

Preferably, the valve solenoids 406a, 408a are driven by pulse width modulation type currents and causes pressure to be modulated at the outlet proportionally, according to the controlled width of step pulses of current applied. While the frequency of the pulses remains substantially the same, the pulse widths are changed to modulate the valves.

During creep operation, the swashplate 128 can only be moved by the actuator 420 and the switches 424, 428, via the valves 406, 408, over a preprogrammed limited range, set in the controller software, to limit vehicle speed.

To actuate the system, the operator must:

1. Be sitting at the rear operator's seat to enable creep drive.

2. Select a direction using the switches 424, 428, either forward or reverse, for vehicle movement.

3. While holding the direction switch 424 or 428, move the speed actuator lever 421. This lever, via the potentiometer 434, will provide an analog signal to the controller 366. This signal will control creep transmission and vehicle speed.

While operating the creep speed control, i.e., while one of the switches 424, 428 are pressed, a "backup alarm" can be provided to sound while the creep system is in use, either in forward or reverse direction, as a warning of vehicle movement.

Figure 14:
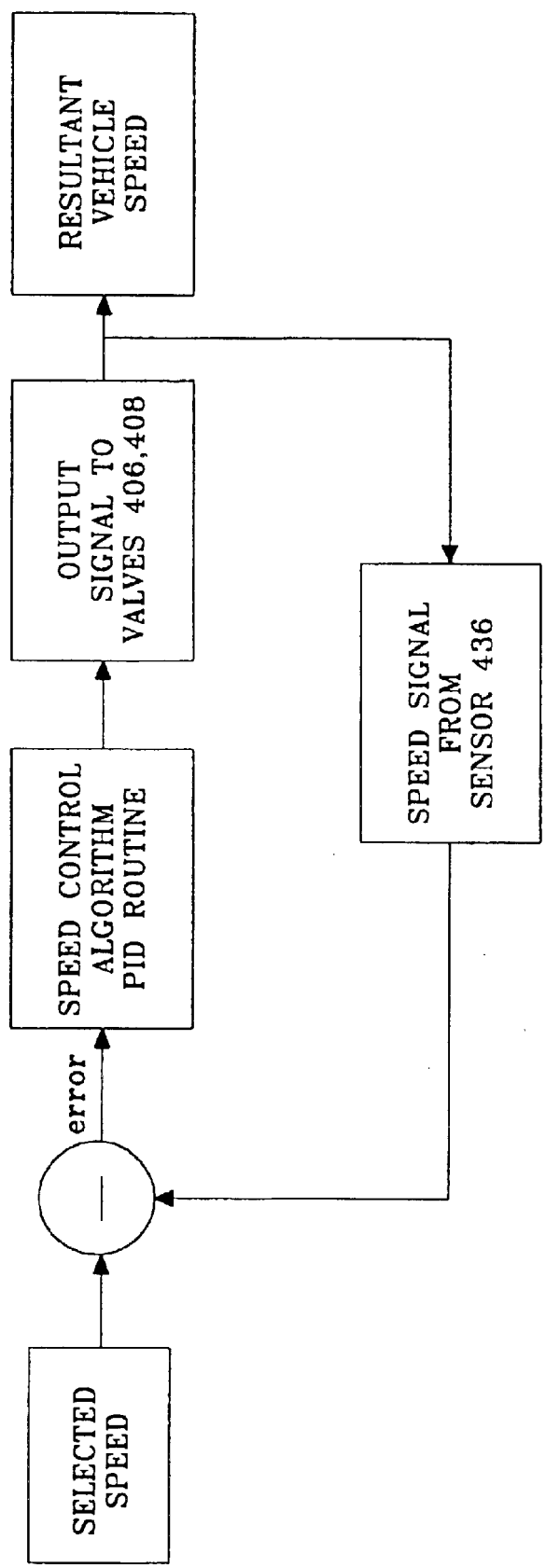
FIG. 14 is a block diagram of a speed control method of the invention.

FIG. 14 illustrates a proportional, derivative, integral (PID) algorithm programmed within the controller 366 software for using the sensor 436 as feedback to correct the vehicle speed based on the ground speed of the vehicle. The measured ground speed from the sensor is compared to the selected speed dictated by the actuator position and an error between the two signals will be used to increase or decrease the output signal to the proportional control valves 406, 408 to increase or decrease tractor speed.

FIG. 15 illustrates the location of the creep speed control actuator 420, the lever 421 and the direction switches 424, 428. As can be seen, the speed control lever 421 and direction switches 424, 428 are located in a convenient location (referto FIG. 1) for the rear implement operator to reach slightly back and to the side with his left hand to control the actuator 420 and one of the direction switches 424, 428 to commence creep forward or creep reverse of the utility vehicle.

Creep Speed Control for a Utility Vehicle Driven by a Reverser Transmission

FIG. 16 illustrates, and a block diagram form, the creep speed control system of the present invention incorporated in a reverser transmission. A reverser transmission is described in detail in U.S. Ser. No. 09/905,645 filed Jul. 13, 2001, herein incorporated by reference. The reverser transmission uses hydraulically actuated forward and reverse clutch packs, to commence forward and reverse movement. According to the creep speed control system of the present invention, as applied to a reverser transmission, the operator actuates a direction switch and a speed actuator and a proportional speed signal is sent to the controller. The controller modulates the clutch pack proportional pressure reducing valves to initiate movement of the vehicle at a controlled and limited rate of speed.

FIG. 16 illustrates a control system 550 for use with a reverser transmission 552 of the type that uses electro-hydraulic control of clutch packs to engage forward or reverse tractor driving direction, for example as embodied in the POWRREVERSER™ transmission used in John Deere Series 4500 PRT and 4600 PRT tractors.

The reverser transmission 552 is driven by an engine drive 553. The reverser transmission 552 drives a range transmission 554 that drives one or more wheels via a differential (not shown).

A controller 556, such as a microprocessor-based microcontroller or an electronic control module, is signal-connected to forward and reverse proportional pressure control valves 562, 566, which in turn are pressure-fluid-connected to forward and reverse clutch packs 572, 576.

For normal operation from the forward-facing seat, a forward-neutral-reverse lever 602 is used to commence movement of the vehicle. The lever 602 is connected to switches 608, which are signal-connected to the controller 556. A clutch switch 634 and pedal position sensor, such as a potentiometer 638, are mounted to a clutch or "inching" pedal and signal-connected to the controller 556.

The forward and reverse clutch packs 572, 578 are hydraulically engaged and spring-released. The torque capacity of the clutch packs is thus a function of the hydraulic pressure supplied to the clutch packs. The proportional valves 562, 566 produce a downstream hydraulic pressure that is proportional to the current applied to the respective valve's solenoid, and thus control the hydraulic pressure supplied to the respective forward or reverse clutch pack.

The controller 556 controls the current to the correct valve 562, 566 and at the correct level to satisfy the clutch torque being commanded by the operator. Based on the operator's command via the vehicle direction selector 602, the forward, reverse, or neither control valve 562, 566 is energized.

Based on the signal from a potentiometer 638, connected to a clutch pedal or "inching pedal" 639, the current to the respective control valve 562, 566 is also modulated as a function of clutch pedal position. The controller compares the output signal that is commanded by the preprogrammed speed/time profile triggered by a signal from the direction switch 608, with an output signal that is commanded from the clutch pedal position signal from the potentiometer 638, and modulates the output signal to the valves 562, 566 according to the smaller of the two speed commands.

A switch 612 senses the presence of an operator on the rear seat 36 and must be activated to enable the creep system, including the actuator 420 and the switches 424, 428. The actuator 420 sends a speed demand signal, proportional to the position of the lever 421, for a direction dictated by the direction switches 424, 428, to the controller 556. The controller 556 sends a control signal, proportional to the speed demand signal, to the valves 562, 566 to modulate clutch pressures. The controller 556 modulates the control signal according to the feedback signal from the speed sensor 436 and the maximum speed for creep mode, preprogrammed in the controller 556.

The ground speed of the vehicle is sensed by the sensor 436 and a signal from the sensor 436 is used as a feedback signal to the controller 556 so that the selected speed is maintaining regardless of the range transmission gear selection or engine speed.

While operating the creep speed control, i.e., while one of the switches 424, 428 are pressed, a "backup alarm" can be provided to sound while the creep system is in use, either in forward or reverse direction, as a warning of vehicle movement.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A utility vehicle control system for a utility vehicle having a forward-facing driving position and a rearward-facing seat, comprising:
   a speed-controllable transmission operable to output power to drive a wheel;
   a creep speed control actuator located adjacent to the rearward-facing seat, said creep speed control actuator operable by an operator to select a desired around speed of the utility vehicle;
   a creep speed control system operatively connected to said actuator and to said transmission, said creep speed control system converting movement of said speed control actuator to speed change of said transmission and
   a ground speed sensor that is signal-connected to said creep speed control system, said ground speed sensor outputting a feedback signal proportional to an actual ground speed of said utility vehicle, wherein said creep speed control system utilizes said feedback signal from said around speed sensor to reduce a difference between said desired ground speed selected by said creep speed control actuator and said actual ground speed.

2. The utility vehicle control system according to claim 1, wherein said transmission comprises a hydrostatic transmission having a variable displacement pump that includes a swashplate, the angular position of the swashplate controlling variable displacement pump capacity, the pump hydraulically connected to a hydraulic motor, and a hydraulic control system having a control spool valve, the movement of which causes pressurized hydraulic fluid to change the angle of said swashplate, and said control system comprises a mechanical link connecting said creep speed control actuator to said spool valve.

3. The utility vehicle control system according to claim 1, wherein said transmission comprises a reverser transmission having a clutch pack, and said control system comprises a controller and a position sensor connected to said lever to output a position signal to said controller, and a pressure control valve hydraulically connected to said clutch pack to actuate said clutch pack, said controller outputting a signal to said control valve to modulate clutch pressure according to actuator position.

4. The utility vehicle control system according to claim 1, wherein said actuator is located to be hand-activated by an operator.

5. The utility vehicle control system according to claim 1, wherein said actuator comprises a speed selector and a separate direction selector.

6. The utility vehicle control system according to claim 1, wherein said transmission comprises a hydrostatic transmission having a variable displacement pump that includes a swashplate, the angular position of the swashplate controlling variable displacement pump capacity, the pump hydraulically connected to a hydraulic motor, and a hydraulic control system having a servo piston housed in a servo cylinder, and connected to said swashplate, movement of said piston within said cylinder causing a change of angle of said swashplate, and a forward pressure control valve and a reverse pressure control valve, said valves hydraulically connected to opposite sides of the servo piston respectively, said forward and reverse pressure control valves selectively energized to move said servo piston within said servo cylinder, and a controller, and said actuator comprises a position sensor to send an actuator position signal to said controller.

7. The utility vehicle control system according to claim 6, wherein said actuator comprises a speed selector and a separate direction selector.

8. The utility vehicle control system according to claim 7, wherein said speed selector and said direction selector are located to be hand-activated by an operator.

9. A utility vehicle control system for a utility vehicle having a forward-facing driving position and a rearward-facing seat, comprising:
   a speed-controllable transmission operable to output power to drive a wheel;
   a creep speed control actuator located adjacent to the rearward-facing seat;
   a creep speed control system operatively connected to said actuator and to said transmission, said creep speed control system converting movement of said speed control actuator to speed change of said transmission;
   wherein said transmission comprises a hydrostatic transmission having a variable displacement pump that includes a swashplate, the angular position of the swashplate controlling variable displacement pump capacity, the pump hydraulically connected to a hydraulic motor, and a hydraulic control system having a servo piston housed in a servo cylinder, and connected to said swashplate, movement of said piston within said cylinder causing a change of angle of said swashplate, and a forward pressure control valve and a reverse pressure control valve, said valves hydraulically connected to opposite sides of the servo piston respectively, said forward and reverse pressure control valves selectively energized to move said servo piston within said servo cylinder, and a controller, and said actuator comprises a position sensor to send an actuator position signal to said controller.

10. The utility vehicle control system according to claim 9, wherein said actuator is located to be hand-activated by an operator.

11. A utility vehicle control system for a utility vehicle having a forward-facing driving position and a rearward-facing seat, comprising:

a hydrostatic transmission operable to output power to drive a wheel;

a creep speed control actuator located adjacent to the rearward-facing seat, said creep speed control actuator outputting a creep speed signal for forward or reverse direction;

a controller having an input for receiving said creep speed signal, and an output sending an output signal substantially proportional to said creep speed signal;

a first pressure control valve signal-connected to said controller for receiving said output signal and hydraulically-connected to said hydrostatic transmission, and energized to cause forward movement of said vehicle, a second pressure control valve signal-connected to said controller for receiving said output signal and hydraulically-connected to said hydrostatic transmission, and energized to cause reverse movement of said vehicle, said controller, by said output signal, energizing one of said first and second control valves corresponding to the speed signal of said actuator.

12. The utility vehicle control system according to claim 11, wherein said controller comprises a microcontroller.

13. The utility vehicle control system according to claim 11, wherein said transmission comprises a variable displacement pump and said first and second control valves comprise proportional control valves.

14. The utility vehicle control system according to claim 11, wherein said creep speed control actuator includes a potentiometer for providing said input signal, said input signal proportional to travel of said creep speed control actuator.

15. The utility vehicle control system according to claim 11, wherein said hydrostatic transmission comprises a servo piston housed in a servo cylinder, said servo piston operatively connected to said swashplate wherein movement of said servo piston changes the angular position of said swashplate, said first pressure control valve and said second pressure control valve hydraulically connected to said servo cylinder on opposite sides of said servo piston.

16. The utility vehicle control system according to claim 11, wherein:

said controller comprises a microcontroller;

said transmission comprises a variable displacement pump and said first and second control valves comprise proportional control valves;

said creep speed control actuator includes a potentiometer for providing said input signal, said input signal proportional to travel of said creep speed control actuator; and said hydrostatic transmission comprises a servo piston housed in a servo cylinder, said servo piston operatively connected to said swashplate wherein movement of said servo piston changes the angular position of said swashplate, said first pressure control valve and said second pressure control valve hydraulically connected to said servo cylinder on opposite sides of said servo piston.

17. The utility vehicle control system according to claim 11, further comprising a ground speed sensor that is signal-connected to said controller, wherein said output signal is modified by said controller using a signal from said ground speed sensor, to achieve a desired ground speed selected by said creep speed control actuator.

18. A method of controlling speed of a transmission from a rear implement-facing seat, comprising the steps of:

while an operator is seated in the rear facing seat, moving a creep speed actuator to output a speed signal proportional to speed demand corresponding to a desired ground speed;

sending said output signal to a transmission of the vehicle to control speed of the transmission;

sensing an actual ground speed of said vehicle and modifying said output signal to reduce a difference between said desired ground speed and said actual ground speed.

19. The method according to claim 18, wherein said step of sending said output signal is further defined in that said output signal is a mechanical signal to a servo system of the transmission.

20. A method of controlling speed of a transmission from a rear implement-facing seat, comprising the steps of:

while an operator is seated in the rear facing seat, moving a creep speed actuator to output a speed signal proportional to speed demand;

sending said output signal to a transmission of the vehicle to control speed or the transmission:

wherein said step of sending said output signal is further defined in that said transmission comprises a hydrostatic transmission having a variable displacement pump controlled for speed and direction by movement of a swashplate, and said swashplate is controlled by at least one proportional control valve, and said output signal is an electrical signal to said proportional control valve.

21. The method according to claim 20, comprising a further step of sensing an actual ground speed of said vehicle and modifying said output signal to reduce a difference between said desired ground speed and said actual ground speed.

* * * * *

UNITED STATES PATENT AND TRADEMARK OFFICE
CERTIFICATE OF CORRECTION

PATENT NO.   : 6,851,495 B2
DATED        : February 8, 2005
INVENTOR(S)  : Sprinkle et al.

It is certified that error appears in the above-identified patent and that said Letters Patent is hereby corrected as shown below:

<u>Column 2,</u>
Line 25, replace "fool" with -- foot --.

<u>Column 9,</u>
Line 64, replace "around" with -- ground --.

Signed and Sealed this

Tenth Day of May, 2005

JON W. DUDAS
*Director of the United States Patent and Trademark Office*